(12) United States Patent
Baatz et al.

(10) Patent No.: US 7,437,004 B2
(45) Date of Patent: Oct. 14, 2008

(54) METHOD FOR PROCESSING DATA STRUCTURES WITH NETWORKED SEMANTIC UNITS

(75) Inventors: Martin Baatz, München (DE); Arno Schäpe, München (DE); Günter Schmidt, Unterhaching (DE)

(73) Assignee: Definiens AG, Munich (DE)

( * ) Notice: Subject to any disclaimer, the term of this patent is extended or adjusted under 35 U.S.C. 154(b) by 168 days.

(21) Appl. No.: 10/168,276

(22) PCT Filed: Dec. 13, 2000

(86) PCT No.: PCT/EP00/12681

§ 371 (c)(1),
(2), (4) Date: Oct. 15, 2002

(87) PCT Pub. No.: WO01/45033

PCT Pub. Date: Jun. 21, 2001

(65) Prior Publication Data

US 2003/0115175 A1     Jun. 19, 2003

(30) Foreign Application Priority Data

Dec. 14, 1999   (DE) ............................... 199 60 372

(51) Int. Cl.
  *G06K 9/62*   (2006.01)
  *G06F 7/00*   (2006.01)

(52) U.S. Cl. .......................................... 382/224; 707/1

(58) Field of Classification Search .................... 707/3, 707/103 R, 5, 1; 345/764; 703/2, 6; 706/10; 382/224

See application file for complete search history.

(56) References Cited

U.S. PATENT DOCUMENTS

| 4,868,733 | A | * | 9/1989 | Fujisawa et al. ............... 707/5 |
| 5,123,057 | A | * | 6/1992 | Verly et al. ................. 382/156 |
| 5,193,182 | A | * | 3/1993 | Bachman et al. ............ 707/100 |
| 5,278,946 | A | * | 1/1994 | Shimada et al. ............... 706/53 |
| 5,631,970 | A | * | 5/1997 | Hsu .......................... 382/113 |
| 5,809,212 | A | * | 9/1998 | Shasha ....................... 706/46 |
| 5,937,400 | A | * | 8/1999 | Au ............................. 706/55 |
| 6,182,062 | B1 | * | 1/2001 | Fujisawa et al. ............... 707/3 |
| 6,751,621 | B1 | * | 6/2004 | Calistri-Yeh et al. ........ 707/100 |
| 6,778,970 | B2 | * | 8/2004 | Au ............................. 706/55 |
| 6,792,418 | B1 | * | 9/2004 | Binnig et al. .................. 707/3 |
| 6,847,980 | B1 | * | 1/2005 | Benitez et al. ........... 707/104.1 |
| 6,871,199 | B1 | * | 3/2005 | Binnig et al. .................. 707/5 |

* cited by examiner

*Primary Examiner*—Wenpeng Chen
(74) *Attorney, Agent, or Firm*—Imperium Patent Works; Darien K. Wallace

(57) ABSTRACT

A method for processing data structures with the aid of networked semantic units. The method includes acquiring a data structure, and generating, modifying, deleting and/or storing semantic structure units and/networking them on the basis of the acquired data structure. The method uses a knowledge base comprised of a network of semantic knowledge units. Semantic structure units and/their network are classified in iterative steps. Based on this classification, a specific processing is activated which modifies a respective semantic structure unit and/a particular partial network.

15 Claims, 7 Drawing Sheets

METHOD FOR PROCESSING DATA STRUCTURES WITH NETWORKED SEMANTIC UNITS

This is a non-provisional application claiming the benefit of International application number PCT/EP00/12681 filed Dec. 13, 2000.

The present invention relates to a general computer implemented method for object-oriented processing of data structures, and in particular relates to a general computer implemented method usable for pattern recognition, grouping of data structure areas (object extraction), and simulation with the aid of the data structures to be processed and with the aid of a knowledge base.

From Niemann H. et al.: "Knowledge Based Image Understanding by Iterative Optimization", in KI-96, vol. 1137, pp. 287 to 301, Springer-Verlag Berlin, 1996, it is known to use a semantic network for image understanding, where image objects as well as their symbolic relationships, attributes etc. are formed with the aid of an initial segmentation process. The segmentation process is performed with the aid of knowledge that is independent of a task, with merely knowledge generally valid for all, or nearly all, types of images being utilized, such knowledge relating to colors, texture, or shape, for instance.

The image objects thus generated constitute an initial description of the image. This symbolically existing initial description thus constitutes an interface with regard to knowledge-based processing. Starting out from the initial description of the image, optimization processing is performed to eventually generate a semantic network enabling an optimal representation of the knowledge contained in the image. These optimization processes are carried out by using a priori knowledge required for a respective specific task, and its internal contexture.

As the final result of optimization processing one thus obtains a semantic network constituting an image interpretation.

One typical difficulty of a like object-based image processing method resides in the extraction of such image objects that are excellent reproductions of meaningful objects in the existing image material in accordance with a set task. In accordance with the above description, for an extraction of image objects one uses segmenting processes that are free of preliminary knowledge and carry out an extraction of image objects on the basis of a homogeneity criterion that relates to relatively general parameters such as color, texture, or shape.

Due to the heterogeneity of objects to be meaningfully described in image materials, due to the presence of noise, due to locally limited blanketing and/or due to the limited information that can be made available for a specific image area, such object-based image processing methods exhibit considerable drawbacks in that much more voluminous information would very often be necessary for being able to make decisions with regard to the formation of image objects. This restricts the flexibility and applicability of the like object-based image processing methods.

This is true not only for the field of image processing but for many tasks where particular information is to be obtained from an arbitrary data structure comprised of single data, for it is a necessary step to meaningfully group single data contained in the data structure into superordinate units, i.e. structure objects, in accordance with a respective task.

It accordingly is an object of the present invention to furnish a computer implemented method for pattern recognition and object-oriented processing of data structures, that is capable of carrying out high-quality grouping of single data contained in a data structure in accordance with the requirements of a respective task.

To be more precise, the method of the invention for processing data structures with the aid of networked semantic units includes the following steps: acquiring a data structure; and generating, analyzing, modifying, deleting and/or storing semantic structure units and/or networking them on the basis of the acquired data structure while using a knowledge base comprised of a network of semantic knowledge units. Semantic structure units and/or the networking thereof are thus classified in iterative steps, and based on this classification a specific processing may be activated which modifies a respective semantic structure unit and/or a particular partial network.

In particular, it is one essential advantage of the present invention that it permits to locally perform highly specific analyses or locally perform highly specific processing, where it is also possible in the respective instances to include particular partial networks such as, e.g., the networked environs. In this way it is possible to make decisions and carry out processing eventually satisfying the requirements of a respective task, even a more difficult one, with respect to the quality of grouping of single data and of classification. Moreover it is an essential advantage that with the present method, it is also possible to supplement information not directly contained in the acquired data structure.

In accordance with the invention, it was moreover realized that in many cases meaningful grouping of single data from the data structure into structure objects, being a type of the structure units, frequently fails because such grouping necessitates a very sophisticated method of structure formation and very complex processing in several partial steps. In particular, criteria according to which structure objects are generated and/or modified may differ from structure object to structure object, or these criteria may be dependent on a respective local context or coherence of a structure object and/or its classification.

Based on the structure of semantic networks whereby structure objects are classified, methods processes are started which modify the respective structure objects and/or particular partial networks such as, e.g., the networked environs. In this way, structure objects may be formed and/or modified by starting out from the data structure to be processed, wherein criteria refer to the preceding steps for a further classification and/or processing, for example by placing properties of previously generated and networked structure objects in a relation.

In a first step, single data may thus e.g. be grouped into structure objects on the basis of a simple criterion. The structure objects thereby generated have new properties such as, for example, an extension, a variance of the individual data contained in the structure objects, or relationships with other networked structure objects, which may be used for further classification and/or processing.

With the aid of a hierarchical network of structure units, information of the underlying data structure may at a same time be represented at various degrees of resolution in accordance with its topology, wherein a structure object being a type of structure units is linked with respective neighboring, sub-, and/or super-structure objects thereof via linking objects which equally are a type of structure units. Thanks to this hierarchical network of structure units, additional information is available, which information is obtained due to the fact that relationships between structure objects are described and evaluated by way of features. To be more precise, information may be processed in the hierarchical network of structure units along links generated by means of the linking objects.

There moreover exists a network of knowledge units. In order to be able to process information contained in a data structure, the two networks of semantic structure units and of semantic knowledge units are interlaced with each other.

Accordingly, what is essential are the kinds of semantic units of which the like networks are built, the corresponding network structures, and in what manner information needs to be processed in order to be able to generate, modify and informationally utilize such networks and the semantic units contained in them.

Structure objects either are unambiguously tied in with a particular topological area of the acquired data structure while representing it and/or properties thereof, or else they are not or not exclusively tied in with a particular area of the acquired data structure but supplement information that is not directly contained in the data structure.

With the aid of structure objects there accordingly results the option of performing a local processing relating to the respective area of the acquired data structure. The structure objects may be linked in various ways among each other and/or with other semantic units. Classification may be carried out with regard to properties of structure objects themselves on the one hand, and/or with regard to relations to properties of other structure objects, or in general other semantic units along links on the other hand.

Classification of links, i.e., of a local context information, results in a significant increase of the possibilities of describing and processing information. It is possible in particular to handle processing steps in a locally differentiated manner, i.e. in adaptation to local circumstances. This means that with regard to processing, local decisions are made which are preceded by a local analysis. What thus unfolds is a permanent interaction between local analyses, resulting classifications, and local processes resulting from the local classification.

The possibility of such local processing naturally does not exclude global processing steps.

The method of the invention may be applied to an arbitrary data structure, wherein processing of an acquired data structure involves handling, analyzing, reproducing, describing, compressing and/or storing the data structure. This also includes database applications.

Processing of the information contained in a data structure is substantially carried out in an object-oriented manner.

Such an arbitrary data structure may, for example, be statistical data or data technically generated by means of sensors.

It may, for example, be a matter of any digital image information. This digital image information may include any imaging, any dimensionality, such as one-dimensional, two-dimensional, three-dimensional, any number of channels and/or temporal sequences.

In summary it is thus noted that the advantages of the method of the invention reside in the possibilities of grouping single data, and thus in the possibilities of processing data structures at various degrees of resolution at a same time, the possibilities of taking local context information into account in a processing while utilizing the information made available through meaningful networking, and the possibilities of applying locally different and specific processing steps. It furthermore is noted that the method of the invention may also be used for a simulation on contents of data structures, such as pictorial contents, for example.

The present invention shall hereinbelow be explained in more detail by way of embodiments while referring to the appended drawings, wherein.

Figure 11:
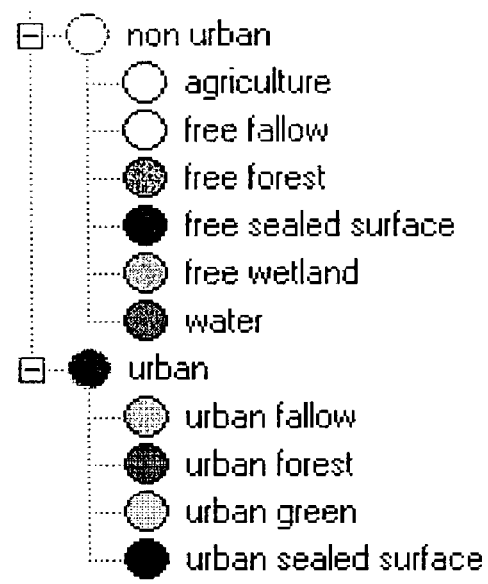
FIG. 11 shows an example for an arrangement of the class objects of FIG. 10 in a grouping hierarchy.
Figure 12:
FIG. 12 shows a representation of an original section from a satellite photograph.
Figure 14:
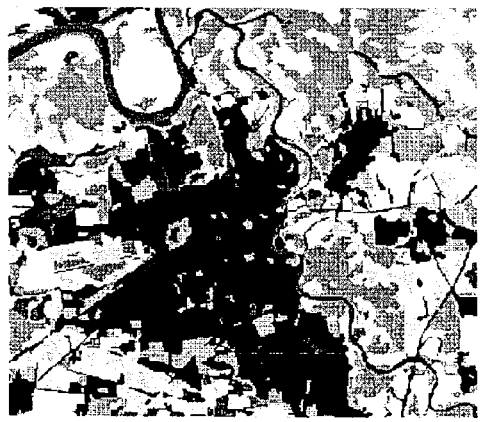
Figure 15:

FIG. 14 is a representation in which same structure objects in accordance with the grouping hierarchy in FIG. 11 are tinted in the color of the respective class objects linked with them, in the same image section as in FIG. 12; and FIG. 15 is a representation in which same structure objects in accordance with the grouping hierarchy in FIG. 11 are tinted in the color of the next-higher class objects in the grouping hierarchy, in the same image section as in FIG. 12.

With regard to the terms "semantic network", "semantic unit", "linking object" and "processing object" as used in this application, reference is made to the present applicant's application having serial no. DE 199 08 204.9 and entitled "Fraktales Netz n-ter Ordnung zum Behandeln komplexer Strukturen" [$n^{th}$-Order fractal network for handling complex structures], filed on Feb. 25, 1999, which corresponds to U.S. Publication No. 2002/0188436, which is a continuation of Ser. No. 09/806,727 filed on Jul. 9, 2001, which claims priority from DE 199 08 204.9, "semantic network" and "fractal network" are to be considered synonymous, the terms "Janus unit" and "processing object" are to be considered synonymous, and the terms "linking unit" and "linking object" are to be considered synonymous. The features disclosed in the above identified application regarding the structure and the operation of the "fractal network", of the "semantic network", the "semantic unit", the "linking unit" and the "Janus unit", are fully incorporated herein by reference.

In advance it is noted that the method described in the following may be implemented both on a single computer and on a distributed network of computers, such as a LAN or WAN, wherein the constituents of the semantic network may in the latter case of the network of computers be present both in a centralized and in a decentralized form. The method described in the following may thus be referred to as a computer implemented method which processes an acquired data structure.

It is furthermore noted that—although the embodiment of the present invention described hereinbelow describes a method for processing image information—the present invention is not restricted to this range of application. The method of the invention may rather be applied to any data structures containing single data which are placed in a topological context. For example, the data structures may be audio data or statistically acquired data (data mining).

In the framework of the invention it was found that in many applications, the grouping of objects in data structures, which are to be described meaningfully, i.e. single data in digital image materials, often is very difficult to perform. They may be heterogeneous or partly concealed; very sophisticated semantics may be necessary for describing what single data of a data structure, for example pixels, pertain to a particular object; and/or criteria permitting the extraction of objects differ between different object classes in a same data structure. Through the method described in the following there is created, for example, a possibility of extrapolating which permits the information not directly contained in the acquired data structure to be supplemented.

In addition, much more voluminous information is used for making decisions than only information reproducible by itself through a structure object, such as color, texture or shape in the case of image processing. Rather, very often it even only is the relations or relationships that, for example, an image area has with other image areas in the case of image processing, that enable a decision. Such a relationship may, for example, be an embedding in particular environs, a positional relation, the relationship of certain properties of an object with other objects, or a composition of particular partial areas.

Accordingly, in the method described in the following, processing steps take place not solely by global criteria, but are also carried out specifically and locally. Local processing is here made possible by structure objects, i.e., object-type representation of an area of the acquired data structure, such as a group of pixels and thus an image area.

It is only through the intermediary of such structure objects which take the place of a quite specific topological area of the data structure so as to represent it, that decisions and processing may locally be carried out in a specific manner. For example, image areas may be placed in a relationship with each other by comparing properties of respective structure objects. Finally it is possible to operate locally and specifically through a classification of structure objects. For example, an image area having been allocated to a class "woods" via its structure object, may be further processed with the aid of a "woods logic". The method thus builds on object-based processing of image information.

The above explanations shall be further elucidated through the following detailed description of the embodiment of the present invention.

One essential feature of the method described in the following is the formally independent consideration of a network that consists of semantic knowledge units and contains the knowledge base necessary for analysis and processing, and of a hierarchical network of semantic structure units in which the information (single data) contained in the data structure to be processed by means of structure objects is at a same time present at various degrees of resolution and moreover as a network.

For processing the information contained in a data structure, these two networks of semantic structure units and of semantic knowledge units are again and again interlaced with each other in an identical or different manner.

One essential feature of the method described in the following thus is the kind of semantic units of which the semantic networks are built, the corresponding network structures, and in what way information has to be processed in order to be able to generate, modify and informationally utilize such networks and the units contained in them.

In order to elucidate the structure of the semantic networks employed in this application, the "building blocks" of a semantic network, i.e., the semantic units shall initially be explained in the following. Semantic units serve the purpose of incorporating informational contents, and in this method there essentially are six different basic types of semantic units, namely, structure objects, linking objects, class objects, analysis objects, processing objects, and feature objects.

Structure objects either are each unambiguously tied in with a specific topological area of the acquired data structure and represent it and/or properties thereof, or they are not exclusively tied in with a specific area of the acquired data structure but supplement information not directly contained in the data structure.

Linking objects each link two arbitrary semantic units among each other in such a way that the kind and the informational content of a respective linking object determine the relationship of the two semantic units among each other.

Class objects represent a class and in particular apply analysis objects and/or processing objects linked with them to semantic units. With the aid of the class objects, semantic units may be analyzed, classified, differentiated, allocated to a class, and/or either themselves or particular partial networks may be modified. A class object may also transfer attributes to semantic units allocated thereto. Class objects constitute the basic unit for the cycle of "analysis-decision-processing" recurringly taking place anew.

Through linking with feature objects, analysis objects include evaluation algorithms whereby they analyse those semantic units to which they are linked, and/or particular partial networks, e.g. the respective networked environs. Analysis objects are in particular tied in with class objects and are applied to those semantic units to which the respective class object is analyzingly connected.

Processing objects each contain processing algorithms whereby they modify those semantic units to which they are linked and/or particular partial networks, for example the respective networked environs, as well as sequencing controls with respect to these algorithms. Processing objects are in particular tied in with class objects and are applied to those semantic units with which the respective class object is connected in a processing manner or possibly in an associating manner.

Feature objects contain feature descriptions and evaluation algorithms for the purposes of local analyses. The like features and evaluation algorithms contain attributes or templates, for instance.

Semantic units include an informational content. This informational content is classified into the three ranges of designation or unambiguous addressing (ID), of data and functions of the semantic unit (DF), and enumeration of all linking objects connecting a respective semantic unit with other semantic units. The enumeration of the linking objects in a semantic unit may, for example, also be present in the form of a classification, so that the relationships realized by way of linking objects are ordered by contents.

The term "semantic structure units" subsumes structure objects, their links among each other, and networks/partial networks of semantic structure units. The term "semantic knowledge units" subsumes feature objects, analysis objects, processing objects, class objects, and their links among each other.

One essential term is the concept of a "particular partial network", presently and in the following designating all further semantic structure units of a particular type and/or a particular classification at a particular distance which, starting out from one or a plurality of particular semantic structure units, are linked therewith either directly or indirectly via other semantic units. A "particular partial network" may in particular also be the networked environs of a semantic structure unit.

A first semantic unit is, for example, defined as pertaining to networked environs of a second semantic unit when a distance between these is smaller than a predetermined or calculated value, i.e. a limit value. A measure of the distance depends on informational and/or connotational contents of the semantic units through which the second semantic unit may be reached from the first semantic unit. It is, for example, possible to calculate the measure of the distance through weightings in linking objects, wherein it is possible for the type of the linking object to also enter into this calculation.

Such weighted linking is, for example, realized by entering a weighting into the informational content of a semantic unit. The networked environs are then defined to the effect that—when starting out from one semantic unit—all those other semantic units directly or indirectly linked with this semantic unit pertain to the networked environs of this semantic unit which may be reached along the linking path by continuous multiplication of the weightings without exceeding or dropping below a predetermined threshold.

As was already mentioned above, linking objects link semantic units among each other. Linking objects are an important precondition for modelling and processing image semantics. In the most simple case, a linking object is a designation or ID, a pointer or a logic link.

The nature of a linking object is essentially responsible for the quality of a linking. The nature of a linking object is determined by a designation of the linking object in the respective informational content and/or by the location or the enumeration in a semantic unit with which the linking object is connected. Particular types of linking objects characterize a respective partial network or a partial space in a hierarchically structured fractal network.

The relationship of two semantic units realized by linking objects need not be symmetrical, i.e. ambiguous in either direction like, for instance, a relationship "is a neighbor of", but in most cases will rather be unsymmetrical, i.e., unambiguous in both directions, like for example a relationship "is sub-object of" and "is super-object of".

It should be pointed out that linking objects may in turn be linked through further linking objects. This results in a general fractal structure of the network. In detail, semantic units may thus be linked with semantic units via linking objects, semantic units may be linked with linking objects via linking objects, and linking objects may be linked with linking objects via linking objects. This results in a fractal structure of a semantic network.

The most important types of linking objects shall in the following be described in more detail.

A linking object of type VS links structure objects with each other.

A linking object of type VSH hierarchically links structure objects with each other and constitutes an unsymmetrical linking which differentiates between super-structure objects and sub-structure objects.

A linking object of type VSN links neighboring structure objects with each other and constitutes a symmetrical linking. The expression "neighboring" here refers to structure objects of a same plane of hierarchy in the hierarchical network of structure objects.

A linking object of type VK constitutes a class link which links a semantic unit with a class object.

A linking object of type VKA constitutes a classifying linking applying an evaluation algorithm contained in an analysis object linked with a respective class object to semantic structure units and/or particular partial networks.

A linking object of type VKZ constitutes an allocating class link which allocates a semantic unit to a class object and thus to the class represented by the class object. Its meaning may be expressed as "in general is" and "in particular is", as a result of which it is synonymous with a linking object of type VSH already explained above. A linking object of type VKZ can transfer attributes from the respective class object to the linked semantic unit.

A linking object of type VKP constitutes a processing class link that applies a processing algorithm contained in a processing object linked with a respective class object to the semantic unit and/or particular partial networks.

A linking object of type VÄ constitutes a similarity link that links class objects with each other along a similarity of feature descriptions with regard to analysis objects, or of processing algorithms with regard to processing objects, whereby a similarity hierarchy of class objects is generated.

A linking object of type VÄH constitutes a hierarchical similarity link that hierarchically links class objects with each other and passes on links with analysis objects, attributes and/or processing objects from super-class objects to sub-class objects by heredity.

A linking object of type VÄHA constitutes a hierarchical similarity link with regard to feature descriptions concerning analysis objects, that passes on links with analysis objects from super-class objects to sub-class objects by heredity.

A linking object of type VÄHJ constitutes a hierarchical similarity link with regard to processing algorithms concerning processing objects, that passes on links with processing objects from super-class objects to sub-class objects by heredity.

A linking object of type VÄN constitutes a neighborhood similarity link that in particular links such class objects with each other that are connected with the same super-class object via a respective linking object of type VÄH, and thus inherit identical feature descriptions with regard to analysis objects, attributes and/or processing algorithms concerning processing objects, and in this respect are considered to be similar.

A linking object of type VÄNA constitutes a neighborhood similarity link with regard to feature descriptions concerning analysis objects.

A linking object of type VÄNJ constitutes a neighborhood similarity link with regard to processing algorithms concerning processing objects.

A linking object of type VG constitutes a grouping link that links class objects with each other with regard to their semantic meaning and groups them, whereby a connotation hierarchy or grouping hierarchy of class objects is generated.

A linking object of type VGH constitutes a hierarchical grouping link which hierarchically links the class objects among each other, with the semantic meaning being "in general is" in an upward direction in the hierarchy, and "in particular is" in a downward direction in the hierarchy. This linking object is related to a linking object of type VKZ to the effect that instead of a structure object, as is the case with the linking object of type VKZ, one class object is here allocated to another class object as a sub-class object.

A linking object of type VGN constitutes a neighborhood grouping link which links class objects of a similar semantic meaning with each other in a neighborhood manner, i.e. on a same plane of hierarchy.

A linking object of type VM constitutes a feature link which links analysis objects and feature objects among each other and applies feature descriptions contained in the feature objects and evaluation algorithms to the semantic structure units that are connected with a respective analysis object.

A linking object of type VÄG constitutes a grouping similarity link which exhibits the properties and functions both of the linking objects of type VÄ and of the linking objects of type VG.

A linking object of type VÄGH constitutes a hierarchical grouping similarity link which exhibits the properties and functions both of the linking objects of type VÄG and of the linking objects of type VGH.

A linking object of type VÄGHA constitutes a hierarchical grouping similarity link which exhibits the properties and functions both of the linking objects of type VÄHA and of the linking objects of type VGH.

A linking object of type VÄGHJ constitutes a hierarchical grouping similarity link which exhibits the properties and functions both of the linking objects of type VÄHJ and of the linking objects of type VGH.

A linking object of type VÄGN constitutes a neighborhood grouping similarity link which exhibits the properties and functions both of the linking objects of type VÄN and also of the linking objects of type VGN.

In the following, a description of the hierarchical semantic network of structure units will be given by way of the above described structure objects and their links.

Figure 1:
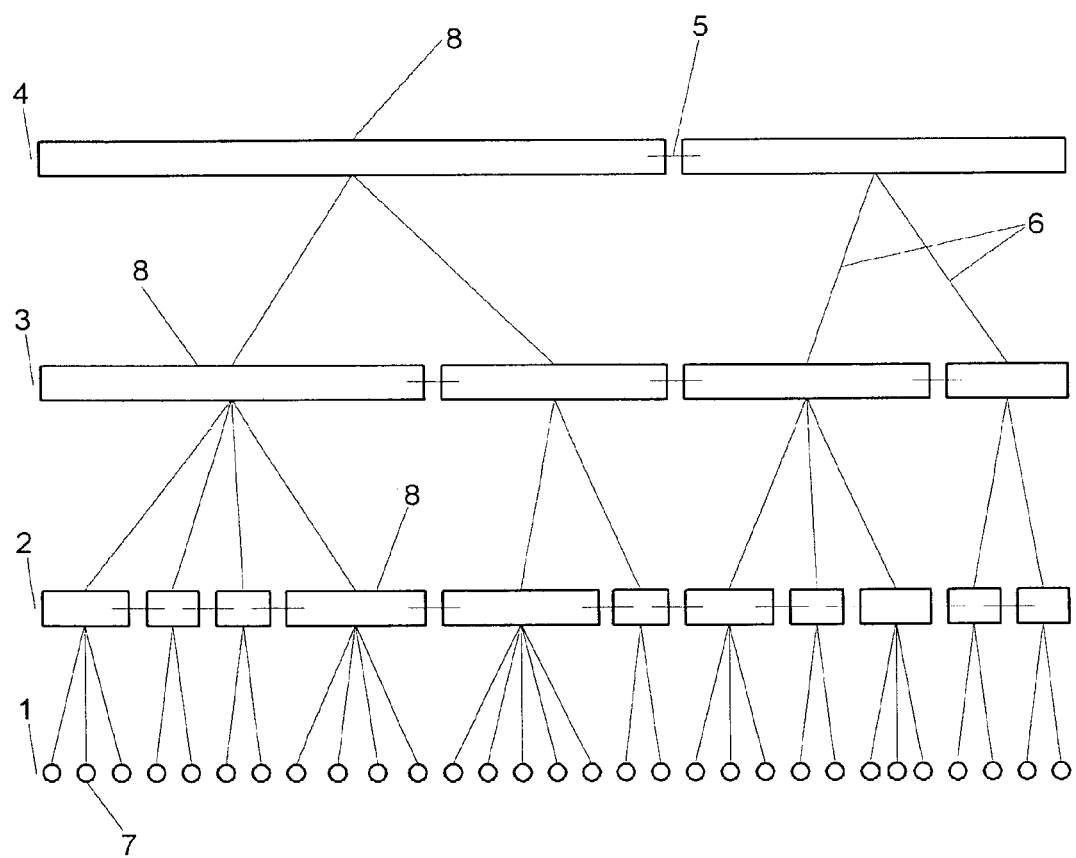
FIG. 1 is a schematic representation of a hierarchical network of structure units in accordance with one embodiment of the present invention.
Figure 2:
FIG. 2 is a representation of image information by means of structure objects in various degrees of resolution in accordance with the representation in FIG. 1 according to the embodiment of the present invention.

FIG. 1 shows a semantic representation of a hierarchical network of structure units in accordance with the embodiment of the present invention, and FIG. 2 shows a representation of image information through structure objects in various degrees of resolution in accordance with the representation in FIG. 1 according to the embodiment of the present invention.

In FIG. 1, reference symbol 1 designates the bottommost plane of hierarchy of the semantic network of structure units, reference symbols 2, 3 and 4 designate different planes of hierarchy of the hierarchical semantic network of structure units, reference symbol 5 designates an exemplary linking object of type VSN, reference symbol 6 designates an exemplary linking object of type VSH, reference symbol 7 exemplarily designates a datapoint object, in the present example representing a single pixel, and reference symbol 8 exemplarily designates structure objects.

Moreover in FIG. 2 the respective image information in the various planes of hierarchy is shown, i.e., in various degrees of resolution, wherein an image information in FIG. 2 corresponding to a respective plane of hierarchy in FIG. 1 is designated by the same reference symbol as the plane of hierarchy in FIG. 1.

As was already mentioned above, structure objects 8 are each tied in with a topological area of the data structure to be processed while representing it. Each individual topological point of the data structure to be processed may be represented by a structure object 8 or, in a hierarchical sense, several structure objects 8. The structure objects 8 may be coherent with regard to the topology of the acquired data structure, however this is not mandatory.

The structure objects 8 contain data describing the individual properties of a respective structure object 8, such as size, position, color values etc.

Further information concerning the topological context is contained in the enumeration of the linking objects 5 and 6 connected with the structure object 8 in the informational content of the structure objects 8. The enumeration is present structured by sub-structure objects, super-structure objects, i.a. linked via a linking object 6 of type VSH, and neighbor structure objects, i.e. linked via a linking object 5 of type VSN.

This is evident from FIG. 1. For example, in the topmost plane of hierarchy 4 of the hierarchical semantic network of structure units, two structure objects 8 are interlinked with a linking object 5 of type VSN and consequently are neighboring. Moreover, for example, a structure object 8 in the topmost plane of hierarchy 4 of the hierarchical semantic network of structure units is linked via a linking object 6 of type VSH with a structure object 8 in the next-lower plane of hierarchy 3 of the hierarchical semantic network of structure units, which means that the structure object 8 in the topmost plane of hierarchy 4 of the hierarchical semantic network of structure units is a super-structure object of the structure object 8 in the next-lower plane of hierarchy 3 of the hierarchical network of structure units, and vice versa the structure object 8 in the next-lower plane of hierarchy 3 of the hierarchical semantic network of structure units is a sub-structure object of the structure object 8 in the topmost plane of hierarchy 3 of the hierarchical network of structure units. As is evident from FIG. 1, in such a hierarchical semantic network of structure units a multiplicity of such links are present by way of the linking objects 5 of type VSN and the linking objects 6 of type VSH.

Another constituent of linking objects 5, 6 of type VS may furthermore be represented by data designating properties of a respective linking, such as, for example, the length of a common edge of contiguous structure objects in a linking object of type VSN.

One special form of the structure object 8 is the datapoint object 7 that represents a single topological location of a data structure, in this case the pixel of an image, complete with its properties. The bottommost plane of the hierarchical semantic network 1 of structure units is also comprised of datapoint objects 7. By means of a linking object 6 of type VSH, each datapoint object may be allocated to another structure object 8 as a direct sub-structure object.

These datapoint objects 7 may at the same time be constituents of a data structure established in conformity with the measures and the topology of the present image material and containing, for each single topological location of a data structure a datapoint object 7 such as, in the case of image processing, a pixel or voxel.

It should be noted that in the above described structure of the hierarchical network of structure units, various planes of hierarchy 1 through 4 may be formed in accordance with the representation in FIG. 1, and with the aid of these various planes of hierarchy 1 through 4 of the structure objects 8, the contents of the data structure to be processed may be represented at a same time in various degrees of resolution, as is represented in FIG. 2. This results in the hierarchy of the semantic network in conformity with topological positional relations of the data structure to be processed.

Such a hierarchical network of structure units need not possess a unified hierarchical depth, i.e., an identical number of planes of hierarchy 1 through 4 in each location, and it is not always necessary for linking objects 5 of type VSN to be contained in the semantic network of structure units. Moreover it is not always necessary for the semantic network to be hierarchically unambiguous. This means that there may be cases of a sub-structure object possessing a plurality of super-structure objects.

It should be noted, however, that with the exception of datapoint objects 7, a structure object 8 always represents that area of the data structure to be processed that is composed of the entirety of all areas represented by the respective sub-structure objects of this structure object 8. In this respect, the hierarchical semantic network of structure units is unambiguous in accordance with the topology of the data structure to be processed.

The above used term of neighborhood may be defined in various ways.

One possible definition is to the effect that all structure objects 8 on a same plane of hierarchy 1 through 4 in the hierarchy of the structure objects 8 that are planarly contiguous in at least one location in a grid are defined to be neighboring.

Another possibility is that all structure objects on a same plane of hierarchy 1 through 4 in the hierarchy of structure objects 8 that are planarly or diagonally contiguous in at least one location in a grid are defined to be neighboring.

With regard to the definition of neighborhood it is also possible to use other criteria which also apply when structure objects 8 are not directly contiguous. For example in the case of image processing, line-type structure objects of an uninterrupted line may be taken to be neighboring.

By referring to FIGS. 3 to 8, in the following local operations shall be described that may be performed within the hierarchical semantic network of structure units.

Figure 3:
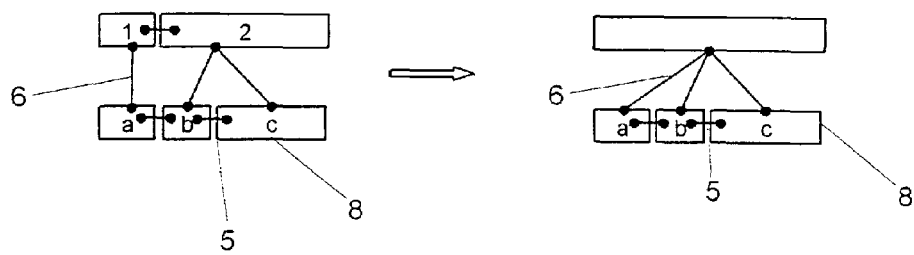
FIG. 3 shows a local operation "fusion" within the hierarchical network of structure units with the aid of a respective network section in accordance with the embodiment of the present invention.

FIG. 3 shows a local "fusion" operation within the hierarchical network of structure units with the aid of a respective network section in accordance with the embodiment of the present invention.

In the local "fusion" operation, two or more already existing structure objects 8 designated as "1" and "2" in the left-hand representation of FIG. 3 are fusioned or fused into a new structure object 8, as can be seen from the right-hand representation of FIG. 3.

Figure 4:
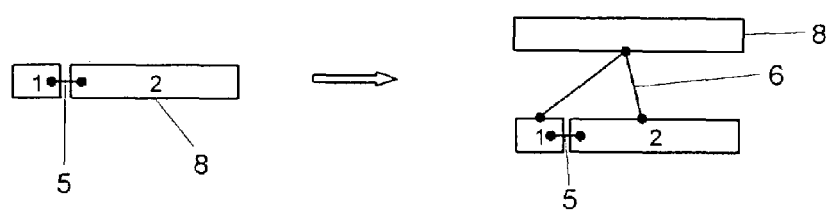
FIG. 4 shows a local operation "founding" within the hierarchical network of structure units with the aid of a respective network section in accordance with the embodiment of the present invention.

FIG. 4 shows a local "founding" operation within the hierarchical network of structure units with the aid of a respective network section in accordance with the embodiment of the present invention.

In the local "founding" operation, a new structure object 8 is generated as a super-structure object for one or several structure objects 8 designated as "1" and "2" in the left-hand representation of FIG. 4 and linked with these via linking objects 5 of type VSH, as can be seen from the right-hand representation of FIG. 4.

Figure 5:
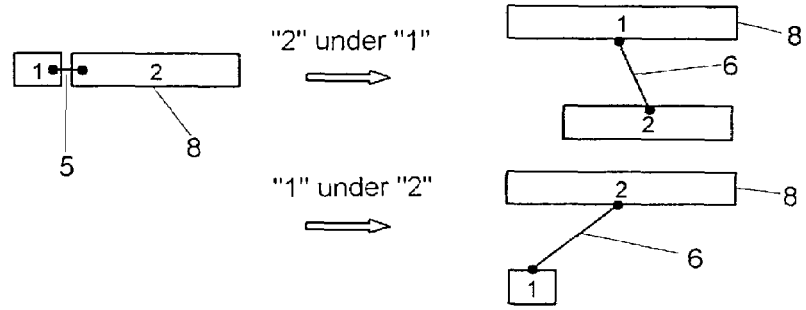
FIG. 5 shows a local operation "insertion of a neighbor as a sub-structure object" within the hierarchical network of structure units with the aid of a respective network section in accordance with the embodiment of the present invention.

FIG. 5 shows a local operation "insertion of a neighbor as a sub-structure object" within the hierarchical network of structure units with the aid of a respective network section in accordance with the embodiment of the present invention.

In the local operation "insertion of a neighbor as a sub-structure object", an existing linking object 5 of type VSN between neighboring structure objects 8 is obliterated, and a new linking object 6 of type VSH is generated between them, whereby a previous neighbor-structure object is allocated to a structure object 8 as a sub-structure object, and accordingly the area of the data structure to be processed that pertains to structure object 8 is enlarged, as can be seen in FIG. 5.

Figure 6:
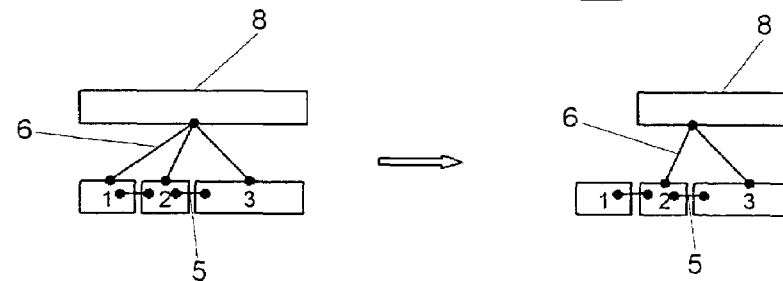
FIG. 6 shows a local operation "exclusion" within the hierarchical network of structure units with the aid of a respective network section in accordance with the embodiment of the present invention.

FIG. 6 shows a local operation "exclusion" within the hierarchical network of structure units with the aid of a respective network section in accordance with the embodiment of the present invention.

In the local operation "exclusion", an existing linking object 6 of type VSH between a sub-structure object and a super-structure object is obliterated, whereby the previous sub-structure object is excluded, and accordingly the area of the data structure to be processed that pertains to structure object 8 is reduced in size, as can be seen in FIG. 6.

Figure 7:
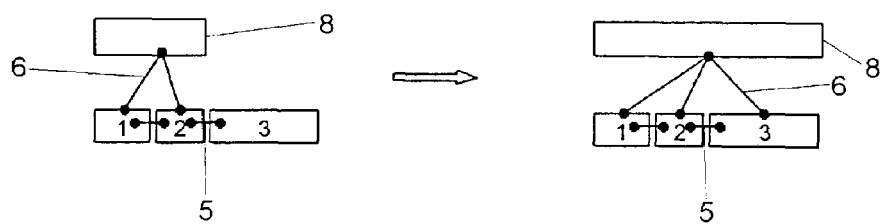
FIG. 7 shows a local operation "insertion of a new sub-structure object" within the hierarchical network of structure units with the aid of a respective network section in accordance with the embodiment of the present invention.

FIG. 7 shows a local operation "insertion of a new sub-structure object" within the hierarchical network of structure units through the intermediary of a respective network section in accordance with the embodiment of the present invention.

In the local operation "insertion of a new sub-structure object" a new linking object 6 of type VSH is generated between a structure object 8 and another structure object 8 hitherto not having been a super-structure object of this structure object 8, whereby a new sub-structure object is allocated to the super-structure object, and accordingly the area of the data structure to be processed that pertains to the super-structure object 8 is enlarged, as can be seen in FIG. 7.

Besides the local operations described above and shown in FIGS. 3 to 7, the following local operations may moreover be performed within the hierarchical network of structure units.

In a local operation "division" a structure object 8 is divided into several new structure objects 8 on the basis of its sub-structure objects. This means that sub-structure objects are grouped into two or more areas of the data structure to be processed, that are each represented by a structure object 8 to be newly generated on the same plane of hierarchy of the hierarchical network of structure units as the divided structure object 8.

In a local operation "deletion" a structure object is deleted, wherein it is possible for its sub-structure objects to become sub-structure objects of the previous super-structure object of the deleted structure object 8.

In a local operation "generating a neighborhood" two structure objects 8 on a same plane of hierarchy of the hierarchical network of structure units that previously had not yet been linked via a linking object 5 of type VSN, are linked with each other via a new linking object 5 of type VSN.

In a local operation "deleting a neighborhood", a linking object 5 of type VSN linking two structure objects with each other on a same plane of hierarchy of the hierarchical network of structure units is deleted.

Figure 8:
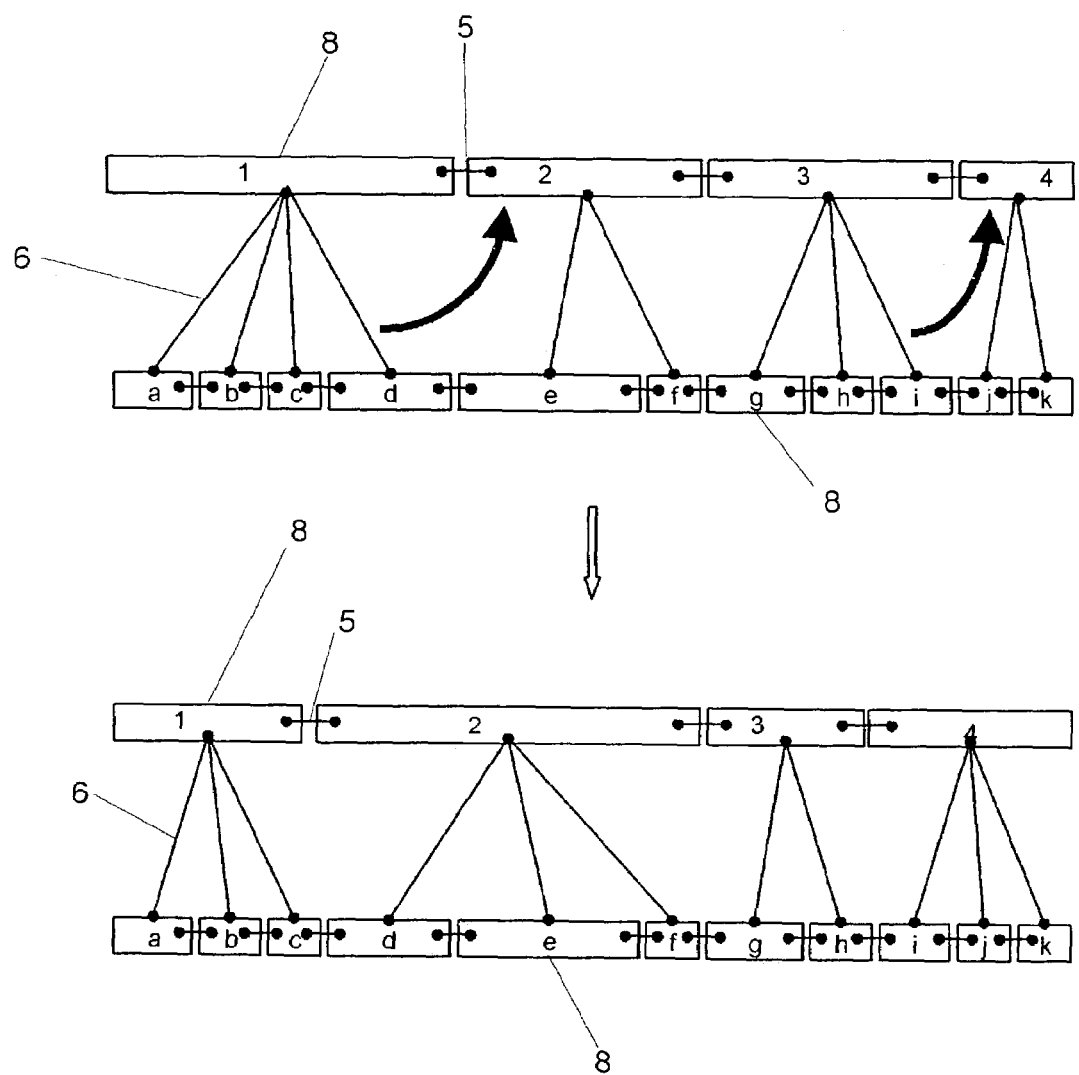
FIG. 8 shows a local operation "boundary optimization" within the hierarchical network of structure units with the aid of a respective network section in accordance with the embodiment of the present invention.

FIG. 8 shows a special local operation "boundary optimization" within the hierarchical network of structure units by way of a respective network section in accordance with the embodiment of the present invention.

In the local operation "boundary optimization" marginal sub-structure objects of a structure object 8 are analyzed as to whether or not they better match a neighbor-structure object of the previous super-structure object than with the previous super-structure object in terms of a predetermined criterion. If they better match a neighbor-structure object, a linking object 6 of type VSH with the previous super-structure object of this marginal sub-structure object is obliterated and a new linking object 6 of type VSH with the better matching structure object 8 is generated to thereby become the new super-structure object.

In FIG. 8 the boundary optimization is carried out such that structure objects designated as "1" to "3" are boundary optimized. To be more precise, the structure objects designated as "d" and "i" and constituting sub-structure objects of the structure objects 8 designated as "1" or "3" are boundary optimized, so that the structure object 8 designated as "2" is allocated to the structure object 8 designated as "d" as a new super-structure object, and the structure object 8 designated as "4" is allocated to the structure object 8 designated a "i".

The following is a description shall be given of the network of semantic knowledge units by way of the above described class objects, analysis objects, processing objects and links thereof, and a representation of the analysis and processing algorithms.

The class objects contained in the network of semantic knowledge units and previously described have three different basic functions.

On the one hand they act analytically, which means that semantic units and/or particular partial networks, in particular the respective networked environs, are analyzed with the aid of an analysis object linked with a class object. In particular, this is performed with regard to a pertinence to the class represented by the class object and with the aid of the above described linking object of type VKA.

They moreover act allocatingly, which means that semantic units are linked with a class object, preferably on the basis of a preceding analysis, by the above described linking object of type VKZ and are thereby allocated to the class represented by the class object.

They finally act processingly, which means that semantic units are linked with a class object with the aid of the above described linking object of type VKZ, and a processing algorithm contained in a processing object pertaining to this class object is applied to the semantic structure units and/or particular partial networks via a linking object of type VKP and the class object.

It should be noted that in this method not only structure units, i.e. structure objects and/or the links thereof, are classified with the aid of class objects. There equally is the possibility of classifying arbitrary kinds of semantic units, which applies in particular to linking objects or class objects. Thanks to this option of classification of arbitrary semantic units, the possibilities of describing and processing contents of the data structure to be processed are increased considerably.

In particular class objects themselves may in turn be a part of analysis algorithms of a feature object, for example for the extraction of a partial network for a particular analysis, or a part of processing algorithms in processing objects, for example for performing a particular step requiring additional analysis, in the entire process described by the processing object. Due to the fact that feature objects and processing objects themselves are constituents of class objects, there results in this way a fractal-hierarchical structure of class objects in the network of semantic knowledge units; this results in a corresponding fractal-hierarchical structure of analysis and/or processing steps.

In accordance with the above description, analysis objects include evaluation algorithms whereby they analyze semantic units linked with them and/or particular partial networks. Analysis objects are as a general rule linked with a class object and are applied to those semantic units with which they are linked analyzingly, and/or to particular partial networks.

The above described evaluation algorithm may be an enumeration of criteria whereby a degree of a pertinence of semantic units to the class object linked with an analysis object is determined. The like criteria are defined with the aid of feature objects, wherein the feature objects are connected with a respective analysis object via the linking object of type VM.

Each feature object evaluates a respective one of the features described hereinbelow. The feature objects are applied individually or in groups, and the results of all evaluations performed are linked with each other with the aid of a logic or a logic link.

This logic may be predetermined in general, such as, e.g., averaging the results of all criteria, be classified hierarchically, be indicated specifically for a respective group of feature objects, or be formulated with the aid of a fuzzy logic.

The linking objects of type VM may moreover be weighted, with the weighting of this linking object of type VM accordingly yielding the measure whereby the respective feature object, or the feature contained therein, is taken into account in an overall evaluation.

With the aid of class objects contained in them and the processing objects thereof, the feature objects may perform virtual or merely temporary structural modifications within the semantic network, in order to evaluate a structural modification within the semantic network potentially following from a respective classification in terms of its result, and to thus classify the semantic unit in question accordingly. With the aid of the processing objects it is furthermore possible to carry out actual modifications that are required for performing a local decision with regard to a classification. For example, with the aid of the processing objects it is thus possible, for the purpose of a further differentiation of structure objects, such as of structure objects "greenlands" and "lawn sports ground", to form sub-structure objects; through the intermediary of their classification and composition, the structure objects "greenlands" and "lawn sports ground" to be actually classified are then differentiated.

Features contained in feature objects and intended to serve for evaluation may be features that relate to a property of semantic units, without the analysis of other semantic units or the relationships with them, such as e.g. color, texture and/or shape features in the case of image processing; features resulting from analysis of a property of the networked environs of a semantic unit, e.g. a composition of sub-structure objects with the aid of a classification; features resulting from a comparison of a property of a semantic unit with a corresponding property of its networked environs, such as e.g. the color contrast of a structure object relative to a super-structure object in the case of image processing; and features resulting from a comparison of a property of a semantic unit with a corresponding property of a particular partial network, such as e.g. the distance of a structure object from the next structure object of a particular classification in the case of image processing. It may, however, for example also be a matching of a structure object with a predetermined template or other analyses.

Features contained in feature objects may moreover result from an analysis of the classification of semantic units of a particular partial network. Examples herefor are a relative total area of the structure objects allocated to a particular class within particular networked environs, or the difference of a property of structure objects allocated to a particular class within a common super-structure object, and many more.

In accordance with the above description, the feature objects are utilized for describing and evaluating single features or attributes, respectively.

The evaluation algorithms contained in them may be of various kinds, such as fuzzy pertinence functions, classifiers evaluating by way of particular "training objects" with the aid of a Nearest-Neighbor method, neuronal networks, statistical analyses or shape templates, whereby semantic units or partial networks of semantic units to be classified or optimized are compared.

Feature objects may be linked both with analysis objects and also with processing objects via the linking object of type VM and are applied by these to the respective semantic units and/or particular partial networks to be processed.

In accordance with the above description, processing objects contain processing algorithms whereby they modify the semantic units and/or particular partial networks directly or indirectly linked with them via a class object. Such modifications are in particular any local operations as already described with regard to the hierarchical network of structure units, wherein instead of the structure objects and their links in general, all kinds of semantic units and links thereof may be processed by means of the local operations; this means that in particular semantic units may be deleted, generated, modified, or linked with already existing semantic units in the hierarchical semantic network.

In order to support a processing, processing objects may carry out partial steps requiring an additional analysis with the aid of class objects linked with them, even during ongoing processing.

For the purpose of structuring and reduction of complexity of "world knowledge", class objects may moreover be linked among each other via different linking objects.

These are the above described linking objects of type VÄ with the subordinate linking objects of types VÄH, VÄHA and VÄHJ, VÄN, VÄNA and VÄNJ, linking objects of type VG with the subordinate linking objects of types VGH and VGN, as well as the linking objects of type VÄG with the subordinate linking objects of types VÄGH, VÄGHA, VÄGHJ and VÄGN.

Herein the linking object of type VG and its subordinate linking objects of types VGH and VGN, which constitute a grouping linking, create a relationship having the meaning "is (semantically) in general" in an upward direction within the hierarchical structure and the meaning "is (semantically) in particular" in a downward direction within the hierarchical structure. This linking object of type VG and its subordinate linking objects of types VGH, VGH and VGN are used for the grouping of class objects and facilitate a definition of relationships between different classes. Generally speaking, they generate a "grouping hierarchy."

The linking object of type VÄ and its subordinate linking objects of types VÄH, VÄHA and VÄHJ, VÄN, VÄNA and VÄNJ, which constitute a similarity link, moreover create a relationship having the meaning "is similar in general" in an upward direction within the hierarchical structure and the meaning "is similar in particular" in a downward direction within the hierarchical structure. What takes place here is a hereditary transfer of links to analysis objects and/or processing objects from super-class objects to sub-class objects. Generally speaking, they generate a "similarity hierarchy".

The processes of hereditary transfer and grouping may be performed separately with the aid of the linking object of type VÄ and its subordinate linking objects of types VÄH, VÄHA and VÄHJ, VÄN, VÄNA and VÄNJ, or by means of the linking object of type VG and its subordinate linking objects of types VGH and VGN.

There is, however, also the possibility of jointly performing the processes of hereditary transfer and grouping, which is carried out with the aid of the linking object of type VÄG and its subordinate linking objects of types VÄGH, VÄGHA, VÄGHJ and VÄGN which have both grouping and heredity properties.

The hierarchies of the class objects that are obtained in this way are either unambiguous, which means that each class object has one super-class object at the most, or they are not unambiguous, which means that each class object may have several super-class objects, and which leads to multiple heredity (similarity hierarchy) or to a multiple semantic pertinence (grouping hierarchy).

The above described linking objects moreover result in a special hierarchical subdivision of the network of class objects. Owing to this subdivision, it becomes possible in particular to formulate more complex semantics for the processing of contents of the data structure to be processed.

In the following it shall be described in what way a classification of semantic structure units is performed.

The structure objects, or generally semantic units, to be classified are initially linked with each respective possible class object via linking objects of type VKA.

Here, two different strategies for carrying out the classification are possible.

The first strategy is that all those class objects qualify for an analysis of respective semantic units to be analyzed, which are located on the bottommost plane of hierarchy of a similarity hierarchy of a network of class objects obtained with the aid of linking objects of type VÄHA, or which are explicitly marked as qualifying. The respective semantic units to be analyzed are linked with these class objects via linking objects of type VKA for the purpose of analysis. Subsequently the analyzed semantic units allocatingly connected via linking objects of type VKZ with one or several class objects whose feature evaluation yields a pertinence or the highest pertinence to the class represented by a respective class object.

The second strategy is that all those class objects qualify which are arrived at, starting out from the class objects on the topmost plane of hierarchy of a similarity hierarchy in the network of class objects obtained with the aid of linking objects of type VÄHA along a hierarchical decision path in the similarity hierarchy. In the case of such a respective class object, this decision path continued in a respective plane of hierarchy of the similarity hierarchy, to which a respective semantic unit to be analyzed exhibits the highest pertinence. The next class objects to be evaluated then are all those class objects linked from the class object having the highest pertinence with the aid of linking objects of type VÄHA in a downward direction in the similarity hierarchy. On this decision path, a respective semantic unit to be analyzed is allocatingly linked, with the aid of a linking object of type VKZ, with the one class object from which there are no further linking objects of type VÄHA in a downward direction in the similarity hierarchy .

Linking objects of type VKA apply the feature objects provided for the analysis object linked with a respective class object (possibly inherited) and the mutual logical links thereof.

In the following, it will be described in what way a local processing is performed.

When a semantic unit is linked with a class object via a linking object of type VKZ, with this class object at the same time being linked with one or several processing objects, then a linking object of type VKP may be generated between the semantic unit and the class object; via this linking object of type VKP, the processing algorithm contained in the processing object(s) is applied to the semantic unit and/or to particular partial networks.

The temporal control process, the time when this takes place, may be predetermined globally for all class objects having a link with a processing object, may be predetermined globally for specific class objects having a link with a processing object, or may be a further constituent of a specific processing object.

With regard to possible modifications within the hierarchical network, reference is made to the above explanations concerning the processing objects.

The following is a description of a cluster analysis of semantic structure units.

With the aid of a customary method, i.e. cluster analysis, semantic structure units in a predetermined feature space may be subsumed into groups of semantic structure units having similar properties for further processing.

Class objects may be generated automatically together with the feature objects pertaining to them, so that they each describe a cluster of similar semantic structure units in a predetermined feature space.

The following is a description of a supplementation of information not directly contained in the acquired data material.

One possibility that is of importance for many applications is the supplementation of information not directly present in the acquired data structure. This is possible thanks to structure objects which do not represent any area of the data structure and may be generated through corresponding analysis and processing prescriptions.

In the following, an exemplary case from image analysis shall be explained. In a two-dimensional image material a three-dimensional situation including a table is represented. Two legs of this table are partly concealed by the tabletop. In a first process of object extraction, structure objects each representing a respective homogeneous area of the image material are created. These structure objects are classified. As a result, there exist i.a. a structure object classified as a tabletop and two structure objects allocated to the class object "incomplete table leg". With the class object "incomplete table leg" there is linked a processing object containing a processing prescription for generating structure objects that supplement an incomplete table leg while taking into consideration further information (such as the extension of the tabletop). As a result, for each structure object of the class "incomplete table leg" a new, neighboring structure object is generated which does not represent an area of the image material and which is allocated to the class "concealed table leg". For each pair of structure objects "incomplete table leg" and "concealed table leg" a new structure object is founded which is superordinated to the two structure objects and associated to the class "table leg". In this way, information not directly contained in the data structure, i.e., the concealed part of the table leg, is supplemented. In a similar manner, it is possible to supplement other information not directly contained in the data structure, and thus a scenery only suggested by the image material may be generated in the form of a network of classified structure objects.

Supplementation of information not directly contained in the acquired data structure may also be effected through transfer of attributes of a class object to semantic units linked thereto. Thus in the above described example, the attribute "solid" of the class "table leg" may be transferred to the corresponding, allocatingly linked structure object.

The following is a description of a processing result by referring to the example of an image analysis/processing:

As the result of an image analysis or processing, there exists a hierarchical network of semantic structure units where each structure object is linked, via linking objects of type VS, with other structure objects of its topological environs and is linked, via linking objects of type VKZ, with either none, one, or several ones of class objects or the class thereby represented, respectively.

Starting out from such class objects, along a hierarchy of connotation by means of linking objects of type VG, further information for each structure object allocated to a class is contained, such as a more general classification via linking objects of type VGH in an upward direction in the hierarchy, or other classes having similar meaning via linking objects of type VGN.

For each class object all of the semantic units allocated to this class object or to the class thereby represented, respectively, may be retrieved via a link through the intermediary of a linking object of type VKZ.

Along the variegated links of the semantic units, navigation through the semantic network may be carried out, wherein a detail information of interest concerning the analyzed or processed image may be retrieved.

The entire resulting semantic network, and thus the information represented in it with regard to pictorial contents, may be stored and loaded anew.

It furthermore is an essential advantage that by taking out all datapoint objects from a network of structure units after a performed processing of an acquired data structure, a strong reduction of the total information is possible without the necessity of limiting the new information obtained through the generated meaningful interlacing of the network of structure units and of the network of knowledge units. The method is consequently particularly well suited for compressing of data structures or for establishing databases.

In order to elucidate the above explanations, several illustrative examples shall be described hereinbelow.

Figure 9:
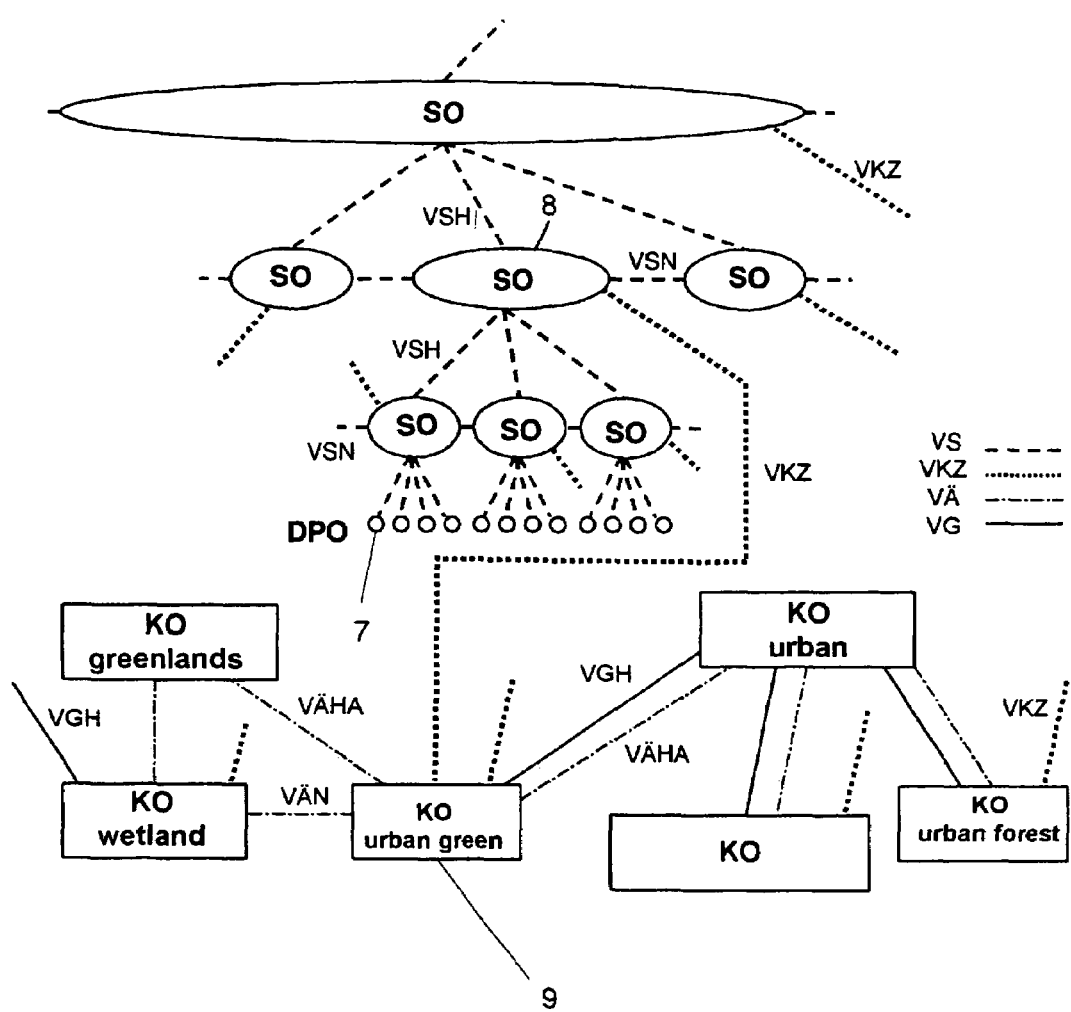
FIG. 9 shows an example for networked environs of a classified structure object and of a corresponding class object in schematic representation.

FIG. 9 shows an example for networked environs of a classified structure object 8 and of a corresponding class object 9 in schematic representation. In this figure, respective linking objects between semantic units are symbolically represented as lines interconnecting these semantic units.

The classified structure object 8 is linked with the class object 9 via an allocating linking object of type VKZ. Moreover the classified structure object 8 is linked with other structure objects designated in the figure as "SO" via hierarchical and neighborhood linking objects of type VS. Through its sub-structure objects, the classified structure object 8 is indirectly linked with the datapoint objects 7 designated by "DPO" in the figure, and thus with the image area that it represents. As is apparent from the figure, the classified structure object 8 that is linked with the class object 9 represents the class "urban green". Via linking objects of type VÄHA, whereby links to analysis objects and thus feature descriptions may equally transferred by heredity, class object 9 is linked with other class objects designated by "KO" in the figure which represent the classes "greenlands" and "urban", and inherits from these the respective feature descriptions such as, e.g., color properties of the class "greenlands" and the property of being strongly surrounded by other urban surfaces of the class "urban". Thus the class object 9, or the class "urban green" represented thereby, respectively, may be referred to as being similar to the class objects or similar to the classes "greenlands" and "urban" represented thereby, respectively. In addition, the class object "urban green", being a subordinate class object, is semantically allocated to the class object "urban" via a linking object of type VGH. Hereby it is determined that semantically speaking, the class object "urban green" in general has to be understood as a class object "urban".

Figure 10:
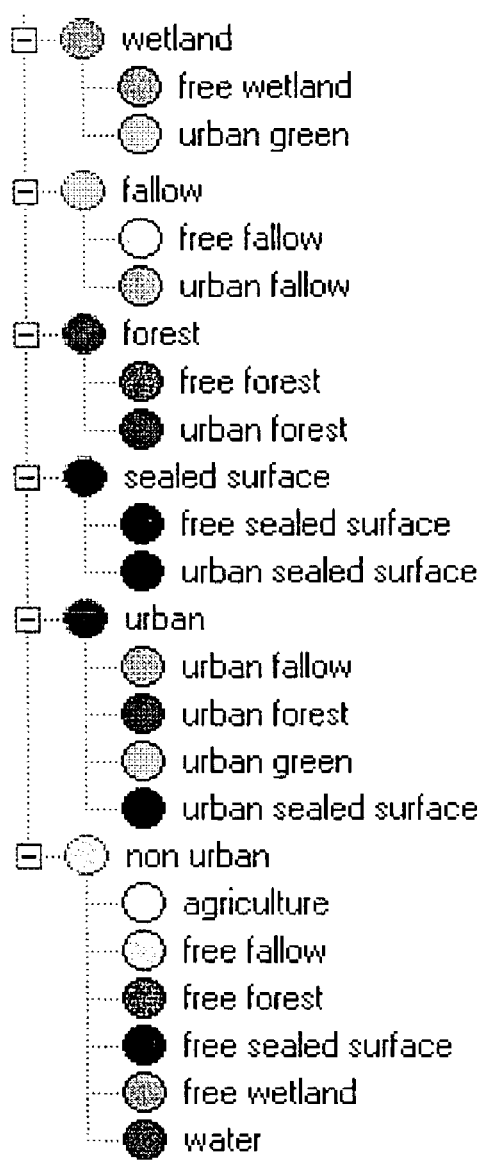
FIG. 10 shows an example for an arrangement of class objects in a heredity hierarchy in accordance with the representation in FIG. 9.

FIG. 10 shows an example for an arrangement of class objects in a heredity hierarchy in accordance with the representation in FIG. 9.

From this figure it is apparent that the class "urban" appears twice as a subordinate class of the classes "urban" and "greenlands".

FIG. 11 shows an example for an arrangement of the class objects of FIG. 10 in a grouping hierarchy.

FIG. 12 shows a representation of an original section from a satellite photograph.

Figure 13:
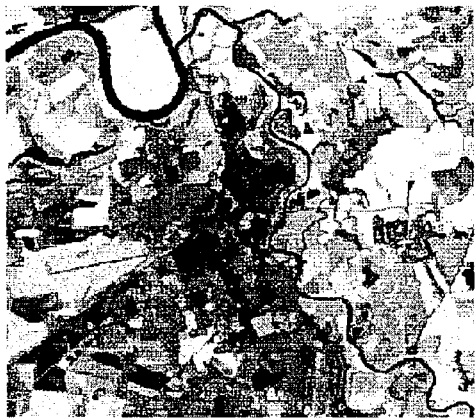
FIG. 13 is a representation of the structure objects in the same image section as in FIG. 12.

FIG. 13 shows a representation of the structure objects in the same image section as in FIG. 12.

FIG. 14 shows a representation in which same structure objects in accordance with the grouping hierarchy in FIG. 11 are tinted in the color of the respective class objects linked with them, in the same image section as in FIG. 12.

FIG. 15 shows a representation in which same structure objects in accordance with the grouping hierarchy in FIG. 11 are tinted in the color of the next-higher class objects in the grouping hierarchy, in the same image section as in FIG. 12.

The following is a description of an exemplary case of image processing, with FIGS. 10 to 15 being explained in more detail.

It is assumed that the task consists in extracting structure objects representing whole, coherent surfaces of land utilization categories or classes "urban" and "non urban" on the basis of satellite photographs.

As is apparent from FIG. 12, sealed surfaces are well discernible from other surfaces on account of their spectral properties. Nevertheless, surfaces of the classes "urban" and "non urban" are spectrally very heterogeneous surfaces. Urban areas contain a great many non-sealed surfaces, while for example cross-country roads are sealed but are to be classified into the class "non urban". Extraction of the land utilization categories or classes "urban" and "non urban" thus constitutes an essential problem wherein it is also necessary for the classification of structure objects to employ a local context information, in order to describe embedding of sealed surfaces in urban environs and embedding of sealed surfaces in non urban environs. This shall be explained in more detail in the following.

On a bottommost plane in the hierarchical network of knowledge units there is a class object "image analysis urban/non urban". This encompasses a processing object or is linked with a processing object, respectively, which contains the following sequencing control reverting to respective partial networks of semantic knowledge units.

First of all, a datapoint object is generated for each pixel of the acquired image information, i.e. of the satellite photograph. Then the datapoint objects are networked in accordance with the topology of the image. These datapoint objects constitute the bottommost plane of the hierarchical network of structure objects.

Subsequently a segmentation of structure objects takes place.

Herefor, by means of the local operation "founding" as described under reference to FIG. 4, initially a structure object consisting of only a single pixel is generated, which means that structure objects are generated and are hierarchically networked as super-structure objects via a linking object of type VSH with a respective datapoint object. The structure objects are networked with each other in a neighboring manner via linking objects of type VSN.

In multiple iterative steps subsequently performed, these neighborhood linking objects of type VSN are analyzed with a class "lowest increase of heterogeneity upon fusion within a particular limit". To this end, a corresponding class object is linked with respective linking objects of type VSN via an analyzing class link through the intermediary of the linking object of type VKA. Those linking objects of type VSN that satisfy an evaluation algorithm contained in an analysis object pertaining to the class object, are allocatingly linked with the class object with the aid of a linking object of type VKZ.

The class object "lowest increase of heterogeneity upon fusion within a particular limit" is at the same time linked with a processing object containing the algorithm "following an allocating classification, directly fusion the structure objects linked by the allocatingly classified linking object". This local "fusion" operation of structure objects has been described above by referring to FIG. 3. Accordingly, those structure objects that are connected via such an allocatingly classified linking object of type VSN, are fusioned to form a corresponding larger structure object, and the linking objects of type VSN towards other neighboring structure objects are updated accordingly.

This process is performed via the hierarchical network of semantic structure units for such a time until there are no more linking objects of type VSN which satisfy the evaluation algorithm contained in the analysis object pertaining to the class object.

As is shown in FIG. 13, homogeneous structure objects of an approximately unified resolution are the result of such a segmentation. What has thus been generated is a hierarchical network of structure objects with datapoint objects on the bottommost plane and structure objects on the top plane.

Next, the classification of the structure objects takes place.

The network of semantic knowledge units contains a partial network with class objects that contain, in the respective analysis object linked with them, feature objects with feature descriptions for the typical types of country coverage occurring in the image, such as "wetland", "forest", "agriculture", "water", "sealed surface" and "fallow" (cf. FIG. 10). There are furthermore two class objects "urban" and "non urban" (cf. FIG. 11) which contain, in the respective analysis object linked with them, feature objects with feature descriptions with regard to embedding in urban environs (cf. FIG. 10).

These feature descriptions in turn access a class object "neighboring structure object at a particular distance". For a feature evaluation, all structure objects allocated to this class object are subsequently analyzed as to whether they are directly or indirectly allocated to the class "urban". For example the property "relative surface of the class "urban" in the particular environs" may be evaluated as a feature.

Other class objects in FIG. 10 are hierarchically linked with the above mentioned class objects via a heritage link through the intermediary of the linking objects of type VÄH, and each inherit the link with the analysis objects contained in a respective object class. In this way, e.g., the class object "urban green" inherits from the class object "wetland" the feature description of having a same appearance as "wetland", and inherits from the class object "urban" the feature description of being highly embedded in urban environs (cf. FIG. 10).

The same class objects are linked into semantically meaningful groups via semantic linking objects of type VGH. All class objects representing an urban land utilization class are linked as sub-class objects with the class object "urban", and all class objects representing freeland classes are linked with the class object "non urban" (cf. FIG. 11).

Classification proper of the structure objects is performed by analytically linking each of the generated structure objects with all class objects on the bottommost plane of the similarity hierarchy. Each structure object is allocatingly linked with the one class object whose feature evaluation yielded the best results, as long as these results lie above a minimum threshold value.

The result of the classification is the allocating linking of the structure objects with a class object (FIG. 14). Structure objects representing, for example, urban green surfaces, are linked with the class object "urban green" due to their embedding in urban environs. Owing to the linking of the class objects in the semantic hierarchy, these structure objects are thus also indirectly linked with the class object "urban" (FIG. 15).

Next, the segmentation of "urban" and "non urban" structure objects takes place.

The aim is the extraction of complete, coherent "urban" or "non urban" surfaces. To this end, a new plane of structure objects is generated as super-structure objects of the previously extracted and classified structure objects by means of the local operation "founding" (FIG. 4), so that the new super-structure objects each completely encompass all those neighboring structure objects as sub-structure objects which are associated either to the class "urban" or to the class "non urban". The result are super-structure objects on a new topmost plane, each representing a surface of homogeneous "urban" or "non urban" land utilization.

Subsequently the classification of "urban whole" and "non urban whole" structure objects on the topmost plane takes place.

The structure objects extracted last are classified through a partial network of semantic knowledge units that encompasses the class objects "urban whole" and "non urban whole". Again the structure objects are allocatingly linked with the one class object whose feature description they match best. As a feature herefor, e.g., an allocating class link through the intermediary of the linking object of type VKZ of the sub-structure objects may be taken into consideration.

The result of the above described overall analysis is a hierarchical structure of structure objects with datapoint objects on the bottommost plane, with the initially extracted and classified structure objects on the nest plane, and with the structure objects extracted and classified last on the topmost plane. In this way the image information is represented both topologically and semantically through structure objects in various degrees of resolution at a same time (e.g. datapoint object, structure object of the class "urban green", structure object of the class "urban whole"). The classifications that are valid with regard to a particular picture element may be retrieved by means of networking starting out from the corresponding datapoint object via the hierarchical linking object of type VSH to structure objects, links of the latter to class objects through the intermediary of the linking objects of type VKZ, and finally the links along the grouping hierarchy of the class objects through the intermediary of the linking objects of type VG.

As was already explained above, the present invention is not limited to the application of image processing but may be employed whenever a data structure is to be processed that includes single data placed in a topological context. For instance it is possible to process a data structure corresponding to a background noise composed of various acoustic sources.

With regard to further features and advantages of the present invention, reference is, however, expressly made to the disclosure of the drawing.

The invention claimed is:

1. A computer-implemented method for processing data structures, said method comprising:
   generating a network of semantic knowledge units, wherein each semantic knowledge unit classifies a physical object;
   generating a network of processing objects, wherein each processing object contains an algorithm;
   acquiring a data structure, wherein the data structure is a digital image comprising datapoint objects;
   segmenting the acquired data structure at various degrees of resolution;
   generating a hierarchy of semantic structure units on the basis of the acquired data structure and the network of semantic knowledge units, wherein each algorithm of each processing object modifies those semantic structure units that are classified to the semantic knowledge units linked to the processing object; and
   iteratively applying at least one of the following methods on a set of the semantic structure units, wherein the applied method depends on a classification of the semantic structure units, and each of the following methods is applicable to a class of the semantic structure units:
   (a) generating new semantic structure units,
   (b) analyzing the semantic structure units,
   (c) modifying the semantic structure units,
   (d) classifying whether each of the modified semantic structure units belongs to the classification,
   (e) modifying the semantic structure units based on the classification,
   (f) deleting the semantic structure units, and
   (g) storing the semantic structure units.

2. The computer-implemented method of claim 1, wherein each of the semantic structure units is a portion of the digital image.

3. The computer-implemented method of claim 2, wherein the classifying in (d) is performed based on a property of the modified semantic structure units, and wherein the property is taken from the group consisting of: a color, a texture, a shape, a position, a size and a length of an edge in common with a contiguous semantic structure unit.

4. The computer-implemented method of claim 1, wherein the datapoint objects are pixel values.

5. The computer-implemented method of claim 1, wherein the digital image is a satellite photograph.

6. The computer-implemented method of claim 1, wherein the digital image is acquired by a satellite optical sensor.

7. The computer-implemented method of claim 1, further comprising:
   displaying a modified semantic structure unit classified in (d).

8. The computer-implemented method of claim 7, wherein the classified modified semantic structure unit depicts urban greenlands in the digital image.

9. The computer-implemented method of claim 7, wherein the classified modified semantic structure unit depicts land cover in a digital image.

10. The computer-implemented method of claim 1, wherein the data structure is an n-dimensional table of data.

11. The computer-implemented method of claim 10, wherein the datapoint objects occupy two dimensions of the n-dimensional table of data.

12. The computer-implemented method of claim 1, wherein the semantic structure units provide a condensed representation of the acquired data structure, further comprising:
   discarding the datapoint objects from the hierarchy of semantic structure units and thereby performing data compression on the hierarchy of semantic structure units.

13. The computer-implemented method of claim 1, wherein the data structure is acquired by scanning one line of datapoint objects of a document at a time.

14. The computer-implemented method of claim 1, wherein the network of semantic knowledge units forms a knowledge base.

15. The computer-implemented method of claim 1, wherein each semantic knowledge unit comprises a feature object, and wherein the classifying in (d) whether the modified semantic structure unit belongs to the classification is performed according to the feature object.

* * * * *